(12) United States Patent
Schlipf et al.

(10) Patent No.: US 12,698,832 B2
(45) Date of Patent: Aug. 4, 2026

(54) SEALING STRIP, CONTROL SURFACE ARRANGEMENT, AIRCRAFT WING AND AIRCRAFT

(71) Applicant: Airbus Operations GmbH, Hamburg (DE)

(72) Inventors: Bernhard Schlipf, Hamburg (DE); Florian Lorenz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 198 days.

(21) Appl. No.: 18/616,757

(22) Filed: Mar. 26, 2024

(65) Prior Publication Data

US 2024/0328513 A1    Oct. 3, 2024

(30) Foreign Application Priority Data

Mar. 27, 2023    (EP) ..................................... 23164254

(51) Int. Cl.
*B64C 9/02*         (2006.01)
*F16J 15/3284*    (2016.01)

(52) U.S. Cl.
CPC ............. *F16J 15/3284* (2013.01); *B64C 9/02* (2013.01)

(58) Field of Classification Search
CPC ....... B64C 9/02; B64C 2009/143; B64C 9/18; B64C 9/14; B64C 9/22; B64C 9/34; B64C 2009/005
See application file for complete search history.

(56) References Cited

U.S. PATENT DOCUMENTS

| | | | |
|---|---|---|---|
| 3,884,000 A | 5/1975 | Faleij | |
| 4,189,120 A * | 2/1980 | Wang | B64C 3/50 |
| | | | 244/214 |
| 2013/0037655 A1* | 2/2013 | Bradley | B64C 3/26 |
| | | | 277/637 |
| 2013/0256461 A1 | 10/2013 | Maenz | |

(Continued)

FOREIGN PATENT DOCUMENTS

| | | |
|---|---|---|
| DE | 102012006187 A1 | 10/2013 |
| EP | 0071669 A1 | 2/1983 |
| EP | 0410328 A1 | 1/1991 |

(Continued)

OTHER PUBLICATIONS

European Search Report for corresponding European Patent Application No. 23164254.7 dated Sep. 1, 2023.

*Primary Examiner* — Magdalena Topolski
*Assistant Examiner* — Shanna Danielle Glover
(74) *Attorney, Agent, or Firm* — Greer, Burns & Crain, Ltd.

(57)    ABSTRACT

A sealing strip for sealing a gap between convexly curved aerodynamic surface elements of an aircraft such that the sealing strip has a convexly curved outer side, the sealing strip having a profile with a mid-seal section and welting sections, wherein the welting sections are arranged at end portions of the profile for fixing the sealing strip at the aerodynamic surface elements and protrude on an inner side from the mid-seal section, wherein the mid-seal section is arranged between the welting sections, wherein at least one stringer-type stiffening structure is provided on the inner side of the mid-seal section. Further, a control surface arrangement, a wing and an aircraft comprising such a sealing strip.

12 Claims, 3 Drawing Sheets

(56)        References Cited

U.S. PATENT DOCUMENTS

2017/0274977  A1      9/2017  Zhang et al.
2020/0385102  A1*  12/2020  Colavincenzo  ........... B64C 9/26

FOREIGN PATENT DOCUMENTS

EP              3222515  A1      9/2017
FR              2479306  A1    10/1981
WO      WO-2015010740  A1  *    1/2015   ............ F01D 11/005

* cited by examiner

II

SEALING STRIP, CONTROL SURFACE ARRANGEMENT, AIRCRAFT WING AND AIRCRAFT

CROSS-REFERENCES TO RELATED APPLICATIONS

This application claims the benefit of European Patent Application Number 23 164 254.7 filed on Mar. 27, 2023, the entire disclosure of which is incorporated herein by way of reference.

FIELD OF THE INVENTION

The invention relates to a sealing strip for sealing a gap between convexly curved aerodynamic surface elements of an aircraft. Further, the invention relates to a control surface arrangement with adjacent control surface elements and a gap therebetween covered by such sealing strip. Further, the invention relates to an aircraft wing having such control surface arrangement. Finally, the invention relates to an aircraft with such control surface arrangement and/or such a wing.

BACKGROUND OF THE INVENTION

Between slats or other control surface elements of an aircraft, a gap is required which is covered by a so called weather seal. The weather seal is a sealing strip which is curved, in use, according to the curvature of the control surface elements.

SUMMARY OF THE INVENTION

An object of the invention is to improve a sealing of a gap between control surfaces of an aircraft in order to enhance aerodynamics.

Such an object may be achieved with a sealing strip according to one or more embodiments described herein. According to further aspects, the invention provides a control surface arrangement, an aircraft wing and an aircraft having a gap sealed by such sealing strip.

The invention provides a sealing strip for sealing a gap between convexly curved aerodynamic surface elements of an aircraft such that the sealing strip has a convexly curved outer side exposed to the outside. The sealing strip has a profile with a mid-seal section and welting sections. The welting sections are arranged at end portions of the profile for fixing the sealing strip at the aerodynamic surface elements and protrude on an inner side from the mid-seal section. The mid-seal section is arranged between the welting sections. At least one stringer-type stiffening structure is provided on the inner side of the mid-seal section.

Preferably, the stiffening structure comprises a flange portion protruding on the inner side of the mid-seal section.

Preferably, the stiffening structure consists only of the flange. Preferably, the flange has a rectangular or trapezoid or triangular section.

Preferably, the stiffening structure comprises a neck portion and a head portion.

Preferably, the head portion comprises at least one longitudinal inner reinforcement and/or reinforcement fibers.

Preferably, the stiffening structure is configured to align the local neutral fiber location of the mid-seal section of the bent sealing strip with the local neutral fiber location of the welting sections.

Preferably, one stiffening structure is provided in the centrum of the sealing strip. Preferably, several stiffening structures are evenly distributed over the width of the mid-seal section. Preferably, even spaces are provided between adjacent stiffening structures. Preferably, even spaces are provided between the at least one stiffening structure and the welting sections.

According to another aspect, the invention provides a control surface arrangement for an aircraft, comprising a first and second control surface element having convexly curved outer surfaces and being arranged side by side in a spanwise direction with a gap therebetween, wherein the gap is covered by a sealing strip according to any of the preceding claims.

Preferably, one of the welting sections is fixed to the first control surface element, the other welting section is fixed to the second control surface element, the outer side of the mid-seal section is convexly curved and exposed to the outside, and the stringer-type stiffening structure protrudes on the concavely curved inner side.

Preferably, the control surface elements are movable between a fully extended position and a fully retracted position.

Preferably, the control surface elements are leading edge slats for an aircraft wing.

According to another aspect, the invention provides an aircraft wing, comprising a control surface arrangement according to any of the aforementioned embodiments.

According to another aspect, the invention provides an aircraft, comprising a control surface arrangement or an aircraft wing according to any of the aforementioned embodiments.

According to another aspect, the invention proposes an use of a sealing strip according to any of the aforementioned embodiments as a weather seal for sealing a gap between convexly curved aerodynamic surface elements of an aircraft such that the sealing strip has an outer side that is exposed to the outside and is convexly curved in use, wherein the at least one stringer-type stiffening structure is configured such that the local neutral fiber of the mid-seal section of the bent sealing strip is shifted from the mid-plane of a main body of the mid-seal section to the inside.

Preferred embodiments of the invention relate to a stringer weather seal.

A weather seal is provided with a stringer in order to enhance its bending behavior so that it can fit better to the form of curved aerodynamic surfaces having a gap therebetween which shall be covered by the weather seal.

According to preferred embodiments of the invention a seal is provided that can be bent such that it fits more closely to curved aerodynamics surfaces such that a step between the aerodynamic surface and the seal is reduced compared to conventional weather seals. Hence, preferred embodiments of the invention have the advantage to improve aerodynamics by reduction of parasitic drags and attachment line discontinuities.

BRIEF DESCRIPTION OF THE DRAWINGS

Embodiments of the invention are explained below referring to the accompanying drawings in which.

DETAILED DESCRIPTION OF THE PREFERRED EMBODIMENTS

Figure 1:
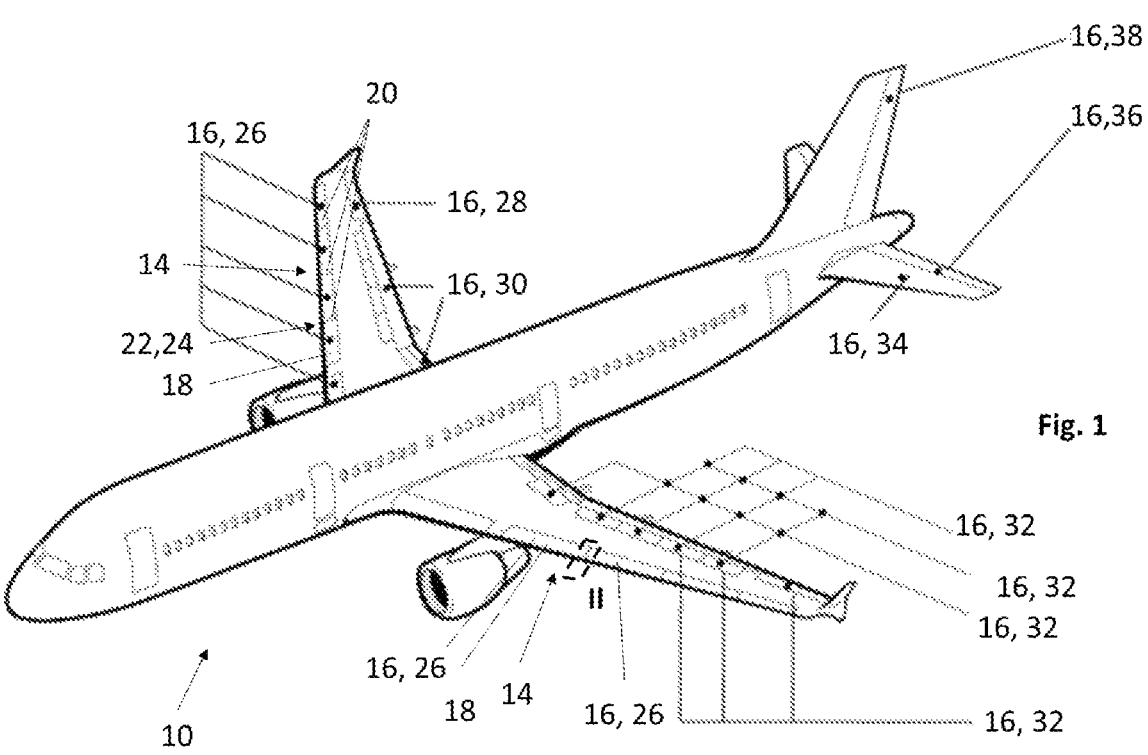
FIG. 1 shows a perspective view of an aircraft with wings and control surface arrangements on the leading edge of the wings.

FIG. 1 shows an aircraft 10 having aircraft wings 12 and control surface arrangements 14. A detail II of one of the control surface arrangements 14 is shown in a spanwise and sectional view in FIG. 2. The control surface arrangement 14 comprises first and second control surface elements 16 having convexly curved outer surfaces 18 and being arranged side by side in a spanwise direction. A gap 20 between the control surface elements 16 is covered by a sealing strip 22 for providing a weather seal 24.

Figure 2:
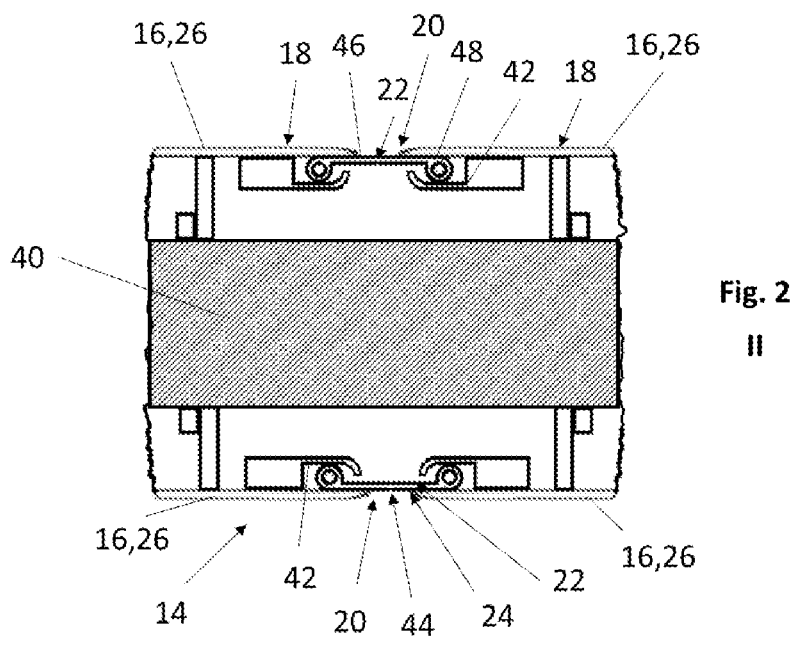
FIG. 2 a spanwise and vertical sectional view through a part of the control surface arrangement which is located at the detail II of FIG. 1, with a sealing strip according to a comparative example.

Referring again to FIG. 1, the aircraft 10 has several control surface elements 16 on different locations. Examples for the control surface elements 16 are slats 26 on the leading edges of the wings 12, ailerons 28 and flaps 30, spoilers 32, trimmable horizontal stabilizers 34, elevators 36, and a rudder 38. Some of the control surface elements 14, especially the leading-edge slats 26, have the convexly curved outer surface 18. FIG. 2 shows a sectional view according to the detail II of FIG. 1 wherein a first and second slat 26 are arranged close to each other with the gap 20 therebetween and wherein a sealing strip 22 according to a comparative example is installed to cover the gap 20. Especially, FIG. 2 shows a slat installation as an example for the control surface arrangement 14 with the weather seal 24.

The slats 26 are movably mounted on a wing structure 40 so that they can move between a fully extended position and a fully retracted position. The weather seal 24 is to be fitted with the slats 26.

For mounting the weather seal 24, the slats 26 are equipped with seal brackets 42 on their inner sides. Other seal mounting structures such as grooves formed integrally in the side regions of the slats 26 are possible.

The seal 24 is to be fitted in the extended slat position and moves together with the slats 26. In accordance with the curvature of the outer surfaces 18 of the slats 26, the sealing strip 22 constituting the weather seal 24 is bent such that its outer side 44 to be exposed to the outside is convexly bent.

Figure 3:
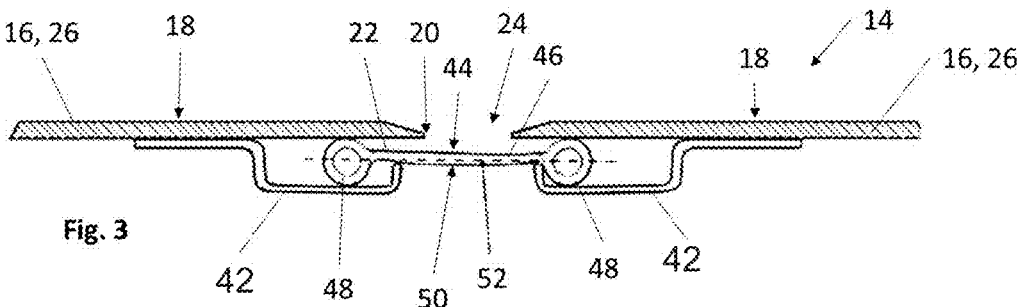
FIG. 3 an enlarged view of the sealing strip of FIG. 2 wherein a possible bending tendency thereof is indicated.
Figure 4:
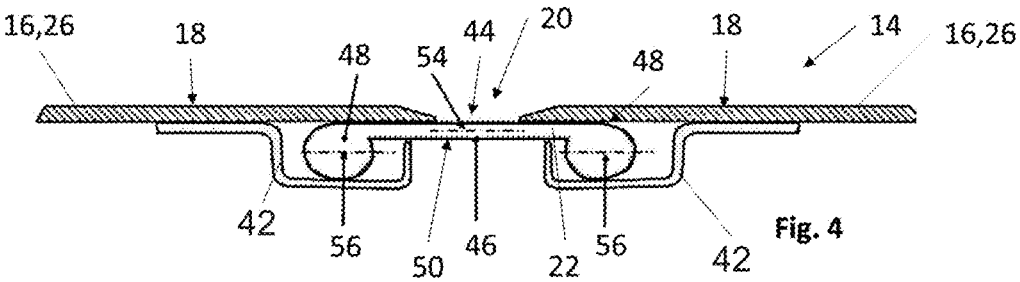
FIG. 4 a further sectional view of the control surface arrangement with the sealing strip according to the comparative example, wherein local neutral fiber of different sections of the sealing strip are indicated.

FIGS. 3 and 4 show further views of this control surface arrangement 14 with the sealing strip 22 according to the comparative example. The sealing strip 22 has a profile with a mid-seal section 46 and welting sections 48. The welting sections 48 are arranged at end portions of the profile so that they are provided along the longitudinal edges of the sealing strip 22. The mid-seal section 46 is arranged between the welting sections 48. The welting sections 48 are used to fix the sealing strip 22 on the control surface elements 16. Especially, the seal brackets 42 enclose the welting sections 48 in a positive engagement. Since the outer side 44 of the sealing strip 22 is intended to lie closely against inner sides at the edges of the control surface elements 16, it is essentially flat as seen in the cross-section, and the welting sections 48 protrude on an inner side 50 of the sealing strip 22.

When the sealing strip 22 according to the comparative example is bent to align with the nose radius, the mid-seal section 46 may be deformed towards the neutral fiber 52 (in sense of bending) of the overall cross-section as shown in FIG. 3. This can happen because the mid-seal section 46 as manufactured is in the tension-area of the bent profile. Thus, this tension "pulls" the mid-seal section 46 on to a smaller bent radius. This reliefs the midseal-section-tension partially. The overall cross section's neutral fiber 52 is driven by the both welting sections 48 which are required to retain the sealing strip 22 and, hence, cannot be overcome by different sizing. FIG. 4 compares the local neutral fiber 54 of the mid-seal section 46 and the local neutral fiber 56 of the welting sections 48 and shows a misalignment of these local neutral fibers 54, 56.

Figure 5:
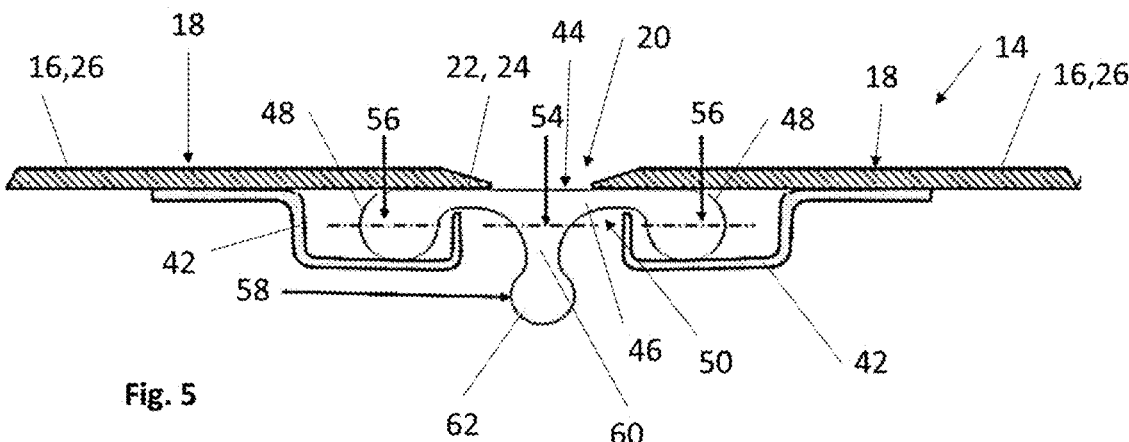
FIG. 5 a sectional view similar to FIG. 4 wherein a sealing strip according to a first embodiment of the invention is provided for sealing a gap of the control surface arrangement.

FIG. 5 shows the control surface arrangement 14 wherein a sealing strip 22 according to a first embodiment of the present invention is installed as weather seal 24. The control surface arrangement 14 is the same as described above. The sealing strip 22 according to embodiments of the invention has the same elements as the sealing strip 22 of the comparative example with the difference that at least one stiffening structure, such as a stringer-type stiffener structure 58, is provided on the inner side 50 of the mid-seal section 46. The stringer-type stiffener structure 58 is configured to align the local neutral fiber 54 of the mid-seal section 46 and the local neutral fiber 56 of the welting sections 48 as good as possible, as visible from a comparison of FIGS. 4 and 5. In order to fulfil this task, the stringer-type stiffener structure 58 may have different forms.

Due to the low Young's modulus in seal-materials the local neutral fibers 54, 56 of the cross section are considered in order to improve the bending behavior of the sealing strip 22 and in order to fit the bent sealing strip 22 better to the curvature of the gap 20. It has been found that the root-cause for detrimental bending effects is a misalignment of local neutral fibers 54, 56 between the mid-seal section 46 and the welting sections 48. By a mid-seal stringer, the local neutral fiber 54 of the mid-seal section 46 is shifted more inward. Preferably, it will be aligned with the local neutral fiber 56 of the welting section 48. By alignment of local neutral fiber locations, the tendency of the mid-seal portion 46 to deform to smaller radii shall be encountered.

Figure 7:
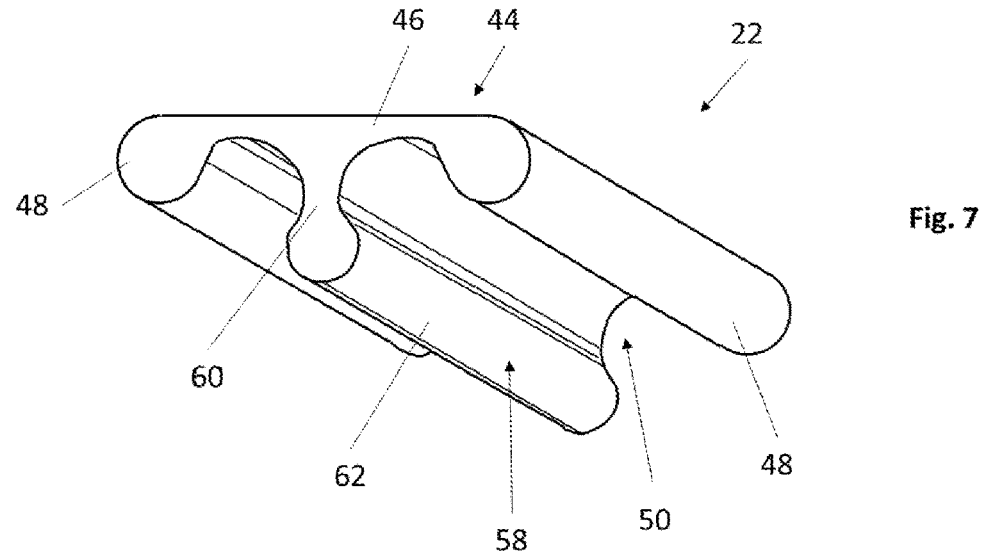
FIG. 7 a perspective view of a length of the sealing strip according to the first embodiment before its installation on the control surface arrangement.
Figure 8:
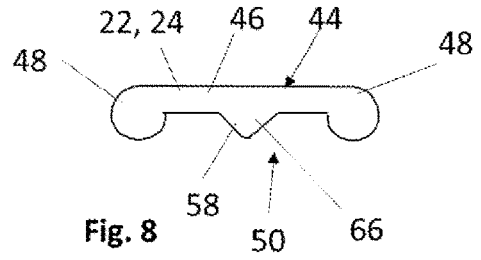
FIG. 8 is a sectional view of a sealing strip according to a third embodiment of the invention.

According to the first embodiment as shown in FIGS. 5 and 7, the stiffener structure 58 has a thinner neck portion 60 and a thicker head portion 62.

Figure 6:
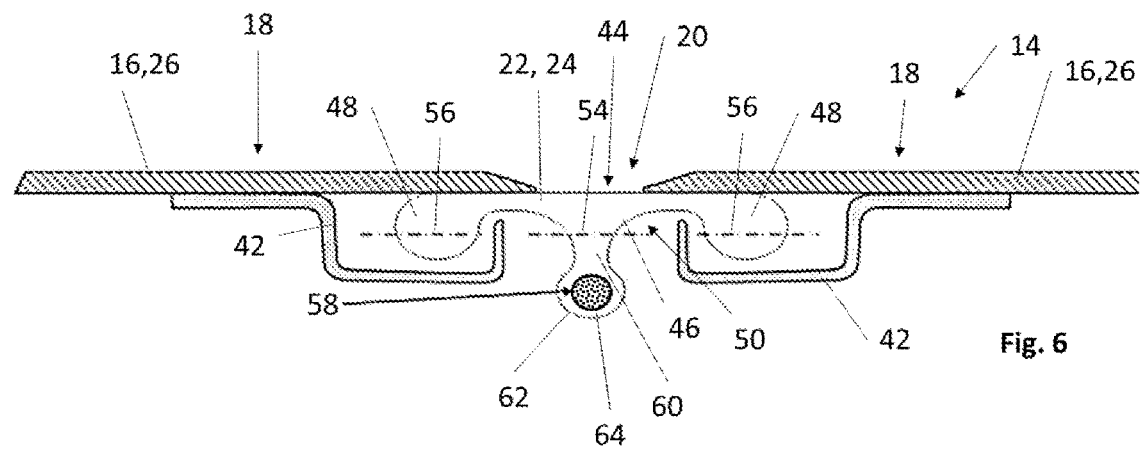
FIG. 6 a sectional view as in FIGS. 4 and 5 wherein a sealing strip according to a second embodiment of the invention is provided for sealing the gap of the control surface arrangement.

According to a second embodiment as shown in FIG. 6, the stiffener structure 58 may contain longitudinal reinforcements such as reinforcing fibers 64. Reinforcement fibers 64 (with a higher Young's Modulus than the seal matrix) in the stringer's head portion 62 may help to reduce the stringer size and probably its weight.

As shown in FIG. 7, the stringer solution can be produced as an end-less constant cross-section seal und thus safe costs. The sealing strip 22 may be made from any materials typical for conventional weather seals, such as rubber.

Figure 9:
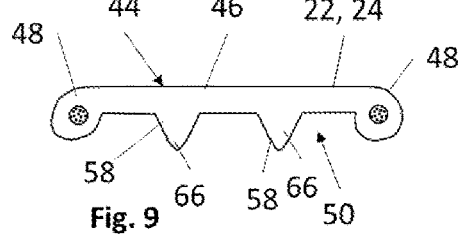
FIG. 9 is a sectional view of a sealing strip according to a fourth embodiment of the invention.
Figure 10:
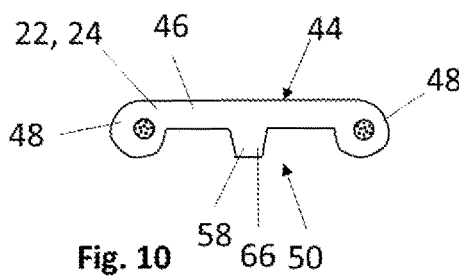
FIG. 10 is a sectional view of a sealing strip according to a fifth embodiment of the invention.
Figure 11:
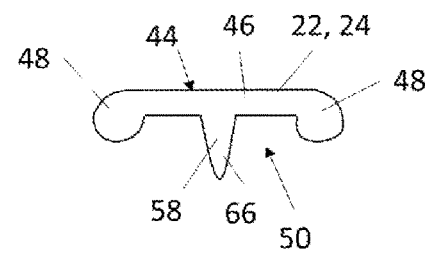
FIG. 11 is a sectional view of a sealing strip according to a sixth embodiment of the invention.

Further embodiments are shown in FIGS. 8 to 11. As visible therefrom, the stiffener structure 58 may also comprise a flange 66 or may even consist of solely the flange 66. Different cross-sections such as a rectangular section, a triangular section or a trapezoid section are possible. Especially for sealing strips 22 having a larger width, several stiffener structures 58 may be provided extending in parallel on the inner side of the mid-seal section 46. A further parameter for adjusting the bending behavior of the sealing strip 22 is the height with which the stiffening structure 58 protrudes from the inner side of the mid-seal section 46. Preferably, all these parameters are chosen such that the local neutral fibers 54, 56 are aligned as good as possible. According to the embodiments shown in FIGS. 5 to 8, 10 and 11, one stiffening structure 58 is provided in the centrum of the sealing strip 22. FIG. 9 shows an embodiment with several stiffening structures 58. The several sealing structures 58 may be evenly distributed over the width of the mid-seal section 46. Preferably, the distances between the stiffening structures 58 and the welting sections 48 are equal.

With preferred embodiments of the invention, the sealing strip 22 will lie in its intended location to close the gap 20 as smooth as possible and/or to avoid a step between the control surface element edge and the outer side 44 of the sealing strip 22 as far as possible. This improves aerodynamics by reduction of parasitic drag and attachment line discontinuities.

In order to improve a sealing of a gap (20) between control surfaces of an aircraft for enhancing aerodynamics, the invention provides a sealing strip (22) for sealing a gap (20) between convexly curved aerodynamic surface elements (16) of an aircraft (10) such that the sealing strip (22) has a convexly curved outer side (44), the sealing strip (22) having a profile with a mid-seal section (46) and welting sections (48), wherein the welting sections (48) are arranged at end portions of the profile for fixing the sealing strip (22) at the aerodynamic surface elements (16) and protrude on an inner side from the mid-seal section (46), wherein the mid-seal section (46) is arranged between the welting sections (48), wherein at least one stringer-type stiffening structure (58) is provided on the inner side (50) of the mid-seal section (46). Further, a control surface arrangement (14), a wing (12) and an aircraft (10) comprising such a sealing strip (22) as weather seal (24) have been described.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGN LIST

10 aircraft
12 wing
14 control surface arrangement
16 control surface element
18 outer surface
20 gap
22 sealing strip
24 weather seal
26 slat
28 aileron
30 flap
32 spoiler
34 trimmable horizontal stabilizer
36 elevator
38 rudder
40 wing structure
42 seal bracket
44 outer side
46 mid-seal section
48 welting section
50 inner side
52 neutral fiber (overall cross-section)
54 local neutral fiber of the mid-seal section
56 local neutral fiber of the welting section
58 stiffener structure
60 neck portion
62 head portion
64 reinforce fibers
66 flange

The invention claimed is:

1. A control surface arrangement for an aircraft comprising:

a first control surface element, and a second control surface element, each control surface element having convexly curved outer surfaces and being arranged side by side in a spanwise direction with a gap therebetween, wherein the gap is covered by a sealing strip, the sealing strip comprising:

a convexly curved outer side, and, a profile with a mid-seal section and welting sections, wherein the welting sections are arranged at end portions of the profile for fixing the sealing strip at the aerodynamic surface elements and protrude on an inner side from the mid-seal section, wherein the mid-seal section is arranged between the welting sections, and wherein at least one stiffening structure is provided on the inner side of the mid-seal section, wherein the mid-seal section of the sealing strip comprises a local neutral fiber, and wherein the welting sections each comprise a local neutral fiber, and wherein the at least one stiffening structure is provided on the sealing strip to align the local neutral fiber of the mid-seal section of the sealing strip, when bent, with the local neutral fibers of the welting sections.

2. The control surface arrangement according to claim 1, wherein the at least one stiffening structure comprises a flange protruding on the inner side of the mid-seal section.

3. The control surface arrangement according to claim 2, wherein the flange has a rectangular or trapezoid or triangular cross-section.

4. The control surface arrangement according to claim 1, wherein the at least one stiffening structure comprises a neck portion and a head portion.

5. The control surface arrangement according to claim 1, wherein the at least one stiffening structure comprises at least one longitudinal inner reinforcement and/or reinforcement fibers.

6. The control surface arrangement according to claim 1, wherein at least one stiffening structure is provided in a center of the sealing strip, or wherein several stiffening structures are evenly distributed over a width of the mid-seal section.

7. The control surface arrangement according to claim 1, wherein a first welting section is fixed to the first control surface element, and a second welting section is fixed to the second control surface element, wherein the at least one stiffening structure protrudes from the inner side.

8. The control surface arrangement according to claim 1, wherein the first and second control surface elements are configured to move between a fully extended position and a fully retracted position.

9. The control surface arrangement according to claim 1, wherein the first and second control surface elements are leading edge slats for an aircraft wing.

10. An aircraft wing comprising:

the control surface arrangement according to claim 1.

11. An aircraft comprising the control surface arrangement according to claim 1.

12. An aircraft comprising the wing according to claim 10.

\*　\*　\*　\*　\*